US007694889B2

(12) United States Patent
Sonoda et al.

(10) Patent No.: US 7,694,889 B2
(45) Date of Patent: Apr. 13, 2010

(54) PRINTED MATERIAL HAVING LOCATION IDENTIFICATION FUNCTION, TWO-DIMENSIONAL COORDINATE IDENTIFICATION APPARATUS, IMAGE-FORMING APPARATUS AND THE METHOD THEREOF

(75) Inventors: Takashi Sonoda, Kanagawa (JP); Takeshi Onishi, Kanagawa (JP); Kohji Taguchi, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 1196 days.

(21) Appl. No.: 11/206,972

(22) Filed: Aug. 19, 2005

(65) Prior Publication Data

US 2006/0193522 A1   Aug. 31, 2006

(30) Foreign Application Priority Data

Feb. 28, 2005   (JP)   ............................. 2005-054713

(51) Int. Cl.
- *G06K 19/06* (2006.01)
- *G06K 7/00* (2006.01)
- *G06K 15/00* (2006.01)
- *G06K 9/36* (2006.01)

(52) U.S. Cl. ...................... 235/494; 235/435; 358/1.18; 382/284; 382/232

(58) Field of Classification Search ................ 358/1.18; 347/107; 382/284, 232; 345/179; 235/494, 235/435

See application file for complete search history.

(56) References Cited

U.S. PATENT DOCUMENTS

| 5,051,736 | A |   | 9/1991  | Bennett et al. |
|-----------|---|---|---------|----------------|
| 5,221,833 | A | * | 6/1993  | Hecht .......................... 235/494 |
| 5,449,895 | A | * | 9/1995  | Hecht et al. .................. 235/494 |
| 5,477,012 | A | * | 12/1995 | Sekendur .................. 178/18.09 |
| 5,502,568 | A | * | 3/1996  | Ogawa et al. ................ 356/620 |
| 5,652,412 | A | * | 7/1997  | Lazzouni et al. ......... 178/18.01 |
| 5,661,506 | A | * | 8/1997  | Lazzouni et al. ............ 345/179 |
| 5,852,434 | A | * | 12/1998 | Sekendur ..................... 345/179 |
| 5,984,193 | A | * | 11/1999 | Uhling ......................... 235/494 |
| 6,115,508 | A | * | 9/2000  | Lopresti et al. ............. 382/306 |
| 6,182,901 | B1 | * | 2/2001  | Hecht et al. .................. 235/494 |
| 6,199,765 | B1 | * | 3/2001  | Uhling ......................... 235/494 |
| 6,279,830 | B1 | * | 8/2001  | Ishibashi ..................... 235/494 |
| 6,325,505 | B1 | * | 12/2001 | Walker ......................... 347/105 |
| 6,330,976 | B1 | * | 12/2001 | Dymetman et al. ......... 235/487 |
| 6,427,920 | B1 | * | 8/2002  | Bloomberg et al. ......... 235/494 |
| 6,439,682 | B1 | * | 8/2002  | Kakutani ...................... 347/15 |
| 6,594,406 | B1 |   | 7/2003  | Hecht |
| 6,641,053 | B1 |   | 11/2003 | Breidenbach et al. |
| 6,651,894 | B2 | * | 11/2003 | Nimura et al. ............... 235/494 |

(Continued)

FOREIGN PATENT DOCUMENTS

JP        03-037707 A      2/1991

(Continued)

*Primary Examiner*—Daniel Walsh
(74) *Attorney, Agent, or Firm*—Sughrue Mion, PLLC

(57) ABSTRACT

A printed material having a location identification function includes multiple encode units provided on an area to be encoded. Each of the multiple encode units records first code information of coordinate values identifying a location on the printed material and second code information of an identification number identifying the printed material, and the first code information and the second code information are invisibly recorded on the printed material.

7 Claims, 19 Drawing Sheets

U.S. PATENT DOCUMENTS

| | | | |
|---|---|---|---|
| 6,704,431 B1* | 3/2004 | Ogawa et al. | 382/100 |
| 6,752,317 B2* | 6/2004 | Dymetman et al. | 235/462.45 |
| 6,994,254 B2* | 2/2006 | Huston et al. | 235/462.05 |
| 7,128,270 B2* | 10/2006 | Silverbrook et al. | 235/472.01 |
| 7,387,261 B2* | 6/2008 | Onishi | 235/494 |
| 7,604,180 B2* | 10/2009 | Sonoda et al. | 235/494 |
| 7,604,182 B2* | 10/2009 | Lapstun et al. | 235/494 |
| 7,611,067 B2* | 11/2009 | Sonoda | 235/494 |
| 2002/0020750 A1* | 2/2002 | Dymetman et al. | 235/472.01 |
| 2002/0070281 A1* | 6/2002 | Nimura et al. | 235/494 |
| 2002/0076080 A1 | 6/2002 | Hecht et al. | |
| 2002/0101597 A1* | 8/2002 | Hoover | 358/1.9 |
| 2002/0193975 A1* | 12/2002 | Zimmerman | 703/6 |
| 2003/0056169 A1* | 3/2003 | Lapstun et al. | 714/808 |
| 2003/0095685 A1* | 5/2003 | Tewfik et al. | 382/100 |
| 2003/0133629 A1* | 7/2003 | Sayers | 382/313 |
| 2003/0190145 A1* | 10/2003 | Copperman et al. | 386/69 |
| 2004/0026636 A1* | 2/2004 | Shigeta | 250/556 |
| 2004/0031852 A1* | 2/2004 | Boitsov et al. | 235/472.03 |
| 2004/0041030 A1* | 3/2004 | Nimura et al. | 235/468 |
| 2004/0071312 A1* | 4/2004 | Ogawa et al. | 382/100 |
| 2004/0190092 A1* | 9/2004 | Silverbrook et al. | 358/539 |
| 2005/0025334 A1* | 2/2005 | Tewfik et al. | 382/100 |
| 2005/0052661 A1* | 3/2005 | Lapstun et al. | 358/1.1 |
| 2005/0073544 A1* | 4/2005 | Scofield et al. | 347/16 |
| 2005/0104861 A9* | 5/2005 | Pettersson et al. | 345/173 |
| 2005/0273597 A1* | 12/2005 | Lapstun et al. | 713/157 |
| 2006/0028674 A1* | 2/2006 | Lapstun et al. | 358/1.15 |
| 2006/0075241 A1* | 4/2006 | Deguillaume et al. | 713/176 |
| 2006/0193522 A1* | 8/2006 | Sonoda et al. | 382/232 |
| 2006/0203314 A1* | 9/2006 | Onishi | 358/540 |
| 2006/0268288 A1* | 11/2006 | Tanaka | 358/1.1 |
| 2006/0279751 A1* | 12/2006 | Onishi | 358/1.8 |
| 2006/0279785 A1* | 12/2006 | Onishi et al. | 358/1.18 |
| 2006/0291701 A1* | 12/2006 | Tanaka | 382/115 |
| 2007/0019245 A1* | 1/2007 | Katsurabayashi | 358/3.28 |
| 2007/0023523 A1* | 2/2007 | Onishi | 235/454 |
| 2007/0035758 A1* | 2/2007 | Hasuike | 358/1.13 |
| 2007/0035774 A1* | 2/2007 | Kubo | 358/3.28 |
| 2007/0045427 A1* | 3/2007 | Onishi | 235/494 |
| 2007/0084932 A1* | 4/2007 | Shinozaki | 235/472.03 |
| 2007/0090177 A1* | 4/2007 | Mitamura | 235/375 |
| 2007/0145141 A1* | 6/2007 | Ayatsuka | 235/462.1 |
| 2007/0158420 A1* | 7/2007 | Sonoda et al. | 235/454 |
| 2007/0171480 A1* | 7/2007 | Matsunoshita | 358/3.28 |
| 2007/0199990 A1* | 8/2007 | Sonoda | 235/454 |
| 2007/0242305 A1* | 10/2007 | Onishi | 358/1.16 |
| 2008/0066973 A1* | 3/2008 | Furuki | 178/19.04 |
| 2008/0095440 A1* | 4/2008 | Onishi et al. | 382/181 |
| 2008/0101699 A1* | 5/2008 | Onishi et al. | 382/181 |
| 2008/0101700 A1* | 5/2008 | Onishi et al. | 382/181 |
| 2008/0101702 A1* | 5/2008 | Sonoda et al. | 382/188 |
| 2008/0130053 A1* | 6/2008 | Okamoto | 358/1.17 |
| 2008/0181447 A1* | 7/2008 | Adams et al. | 382/100 |
| 2008/0192278 A1* | 8/2008 | Ouchi | 358/1.13 |
| 2008/0236903 A1* | 10/2008 | Lapstun et al. | 178/18.01 |
| 2008/0285070 A1* | 11/2008 | Takeuchi et al. | 358/1.15 |
| 2009/0001167 A1* | 1/2009 | Usuba | 235/462.16 |

FOREIGN PATENT DOCUMENTS

| | | |
|---|---|---|
| JP | 06-506080 A | 7/1994 |
| JP | 06-309084 A | 11/1994 |
| JP | 07-098751 A | 4/1995 |
| JP | 07-141104 A | 6/1995 |
| JP | 08-036452 A | 2/1996 |
| JP | 200-227833 A | 8/2000 |
| JP | 2002-304251 A | 10/2002 |
| JP | 2003-500720 A | 1/2003 |
| JP | 2003-511761 A | 3/2003 |
| JP | 2003-511762 A | 3/2003 |
| JP | 2003-513368 A | 4/2003 |
| JP | 2004-140825 A | 5/2004 |
| JP | 2005-507535 A | 3/2005 |
| WO | 92/17859 A1 | 10/1992 |
| WO | 00-72110 A2 | 11/2000 |
| WO | 01/26032 A1 | 4/2001 |
| WO | 01/31519 A1 | 5/2001 |
| WO | 03/038741 A1 | 5/2003 |

* cited by examiner

ASYMMETRIC SYMBOL EXAMPLE

ROTATION OF 90 DEGREES

ROTATION OF 180 DEGREES

ROTATION OF 270 DEGREES

SYMMETRIC SYMBOL EXAMPLE

ROTATION OF 90 DEGREES

ROTATION OF 180 DEGREES

ROTATION OF 270 DEGREES

RANGE TO BE READ

FIG. 8A

DATA   0 1 1 1 0 0 0 1 0 1 0 1 1 0 1 0 0 0 0 1 1 0 0 1 0 0 1 1 1 1
CHECK  0 1 0 0 1 1 0 0 1 0 0 1 1 1 1 0 1 1 1 0 0 0 1 0 1 0 1 1 0 1

FIG. 8B

DATA   0 1 1 1 0 0 0 0 1 1 0 0 1 0 0 1 0 1 1 0 1 0 0 0 0 1 1 0 0 1 1 1 1 1
CHECK  * * * * 1 * * * 0 * * 1 * * * * * * * * * 0 * * * * *

RANGE TO BE READ

NO ERROR

ERROR

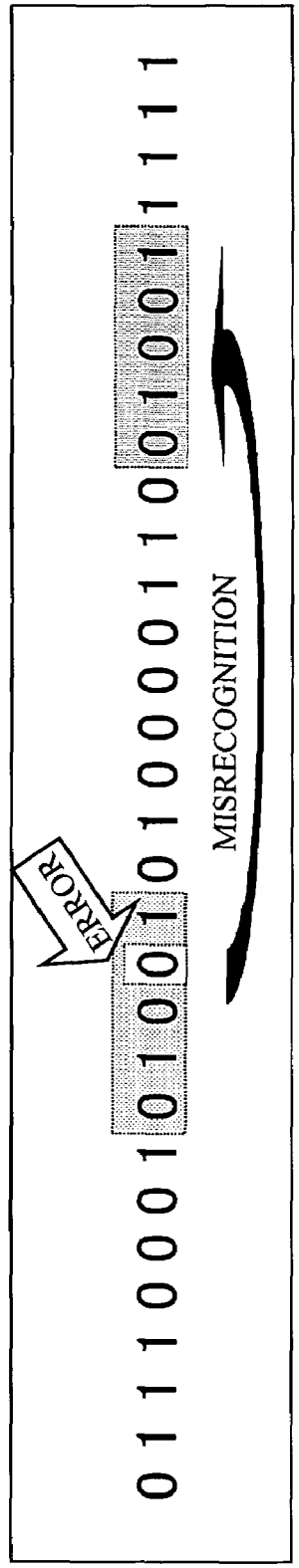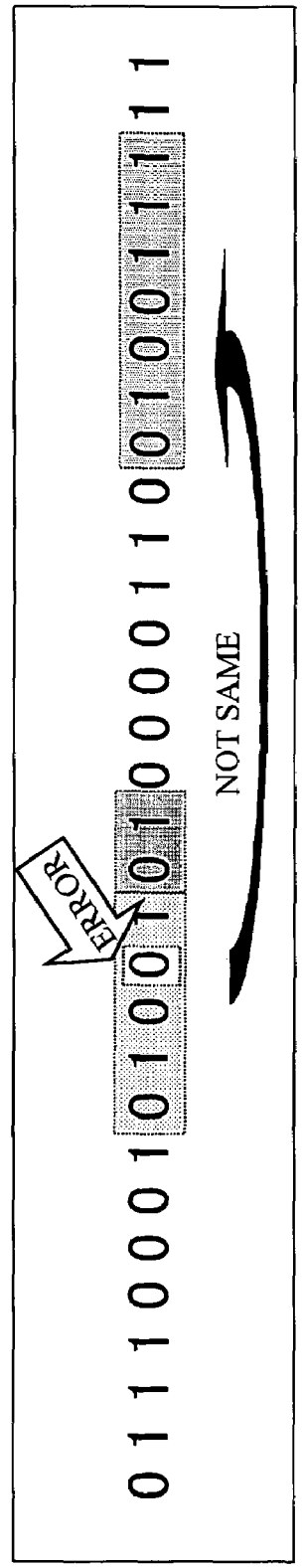
FIG. 11A
FIG. 11B

FIG. 12

| ERROR NUMBER | DETECTION PROBABILITY |
|:---:|:---:|
| 1 | 1.0 |
| 2 | 1.0 |
| 3 | 0.923 |
| 4 | 0.923 |
| 5 | 0.944 |

FIG. 13

| ERROR NUMBER | DETECTION PROBABILITY |
|:---:|:---:|
| 1 | 1.0 |
| 2 | 1.0 |
| 3 | 0.968 |
| 4 | 0.965 |
| 5 | 0.969 |

PRINTED MATERIAL HAVING LOCATION IDENTIFICATION FUNCTION, TWO-DIMENSIONAL COORDINATE IDENTIFICATION APPARATUS, IMAGE-FORMING APPARATUS AND THE METHOD THEREOF

BACKGROUND OF THE INVENTION

1. Field of the Invention

This invention relates to a technique for reading a part of symbols uniformly arranged on a two-dimensional plane and identifying a location thereof.

2. Description of the Related Art

In recent years, the techniques have been proposed for arranging the symbols uniformly, reading the symbol, and identifying the location thereof on the two-dimensional plane. For example, the symbols are uniformly arranged on a sheet of paper on which an examination is printed. By scanning the location of the answer selected by the examinee, the selected answer is transmitted to a telecommunications carrier or the like. The system that employs the aforementioned technique has been proposed (for example, as shown in FIG. 18).

An M-sequences code is often used for coding the two-dimensional plane. The M-sequences code has the characteristics of "any two partial sequences are not identical, if the partial sequences having a length of m is extracted from the M-sequences code having a length of $2^m-1$." Several techniques employing the aforementioned characteristics have been proposed for encoding the plane.

The M-sequences code denotes the code having a longest cycle ($2^p-1$) from among the sequences created with the following expression of a p-th degree recurrence equation (also known as pseudo-random sequences).

$$a_t = c_1 a_{t-1} + c_2 a_{t-2} + \ldots + c_p a_{t-p} (\mathrm{mod}\ 2) \qquad \text{(Expression 1)}$$

For example, if P=5, $C_1$=1, $C_2$=1, $C_3$=1, $C_4$=0, and $C_5$=1, the M-sequences (the length $2^5-1=31$) shown in FIG. 19 is generated. As shown in FIG. 19, three partial sequences A, B, and C having the same length of p, which are taken out of difference positions in the M-sequences, are by no means identical. This characteristic enables the identification of the location on the two-dimensional coordinates with an accuracy of 1 bit.

For example, if 1 bit is represented by a symbol of 0.3 mm, the 10th degree M-sequences will be able to express the long side of a size A4 sheet having a length of 297 mm as follows.

$$(2^{10}-1) \times 0.3\ \mathrm{mm} = 1023 \times 0.3\ \mathrm{mm} = 306.9\ \mathrm{mm}$$

It is to be noted that the aforementioned expression can encode only one sheet of size A4. Encoding a huge area demands a higher M-sequences. This causes problems in that the area to be read has to be larger at the time of identifying the location on the plane, and in addition, the decoding becomes complicated.

According to Japanese Patent Application Publication No. 2003-511762 (Document 1), referring to FIG. 20, the identical M-sequences codes are arranged in parallel in a Y-axis direction on the plane to indicate the coordinate positions. The M-sequences codes arranged in parallel with the Y-axis direction are shifted from each other. For example, as shown in FIG. 20, the second line from the left is shifted by 2 bits from the third line. The third line is shifted by nine bits from the fourth line. The fourth line is shifted by 24 bits from the fifth line. The fifth line is shifted by ten bits from the sixth line. The above-mentioned M-sequences codes are the same if arranged on the same X-coordinate. In the same manner, the identical M-sequences codes are arranged in parallel in the X-axis direction on the plane to express the coordinate positions. The M-sequences codes arranged in parallel with the X-axis direction are shifted from each other. Here, a synchronization method is omitted in the description for simplification.

The technique described in Document 1, however, has to be devised for identifying an edge of the sheet of paper so as to be applied to a practically useful size such as the size A4. In other words, referring to FIG. 21, the location can be identified on an encoded whole area, yet the page identification also has to be obtained from the encoded area in order to identify the location of the page (the plane) on the encoded whole area. In addition, there is a drawback in that the redundancy in encoding becomes large by segmenting the multiple M sequences codes. Further, there is another drawback in that the calculation load becomes heavier due to the complicated algorithm for encoding and decoding.

SUMMARY OF THE INVENTION

The present invention has been made in view of the above circumstances and provides a printed material having a location identification function, two-dimensional coordinate identification apparatus, and image-forming apparatus and method thereof, with which a huge area can be encoded and an accuracy of location detection can be improved.

According to one aspect of the present invention, there may be provided a printed material having a location identification function comprising multiple encode units provided on an area to be encoded. Each of the multiple encode units records first code information of coordinate values identifying a location on the printed material and second code information of an identification number identifying the printed material; and the first code information and the second code information are invisibly recorded on the printed material. The coordinate values identifying the location on the printed material and the identification number identifying the identification number are separately encoded and recorded, enabling encoding a huge area. The coordinate values and the identification number are recorded in every encode unit. This makes it possible to identify the location on the printed material and the identification number of the printed material. Moreover, the aforementioned first code information is capable of improving accuracy in the location detection.

According to another aspect of the present invention, there may be provided a two-dimensional coordinate identification apparatus including an image reading potion that reads an image provided in a given area on a printed material on which first code information of coordinate values identifying a location on the printed material and second code information of an identification number identifying the printed material are recorded in each of multiple encode units provided on an area to be encoded, a detecting portion that detects the first code information and the second code information, with the image provided in the given area that has been read, and a decoding portion that decodes the first and second code information and invisibly outputs the identification number and the coordinate values. The image is read from the printed material having the first code information and the second code information printed thereon, so that the first and second code information is detected and decoded. This makes it possible to identify the identification number of the printed material and the location on the printed material with high accuracy.

According to a further aspect of the present invention, there may be provided an image-forming apparatus including an identification number encoding portion encoding an identification number that identifies a printed material; a coordinate encoding portion encoding coordinate values that identifies a location on the printed material; a symbol creating portion creating symbols of the identification number and the coordinate values according to codes of the identification number and the coordinate values; a combining portion combining an image to be printed and the symbols of the identification number and the coordinate values; and an image creating portion invisibly recording the symbols of the identification number and the coordinate values in each of multiple encode units provided on an area to be encoded and creating the printed material having the image to be printed on the symbols of the identification number and the coordinate values. Reading an encode unit or an area corresponding to the encode unit enables to obtain the location on the printed material and the identification number of the printed material.

According to a further aspect of the present invention, there may be provided a two-dimensional coordinate identification method including reading an image provided in a given area on a printed material on which first code information of coordinate values identifying a location on the printed material and second code information of an identification number identifying the printed material are recorded in each of multiple encode units provided on an area to be encoded; detecting the first code information and the second code information with the image provided in the given area that has been read; and decoding the first and second code information and invisibly outputting the identification number and the coordinate values.

BRIEF DESCRIPTION OF THE DRAWINGS

Embodiments of the present invention will be described in detail based on the following figures, wherein:

FIGS. 8A and 8B show a conventional error-detecting method;

FIG. 9 shows an error-detecting method of the present invention;

FIGS. 11A and 11B show further another error-detecting method of the present invention;

FIG. 12 shows probabilities of detection error with the error-detecting method of the present invention;

FIG. 13 shows other probabilities of detection error with the error-detecting method of the present invention;

DESCRIPTION OF THE EMBODIMENTS

A description will now be given, with reference to the accompanying drawings, of embodiments of the present invention.

Embodiments

Printed Material Having Location Identification Capabilities

First, a description will be given of a printed material having a location identification function.

Figure 1:
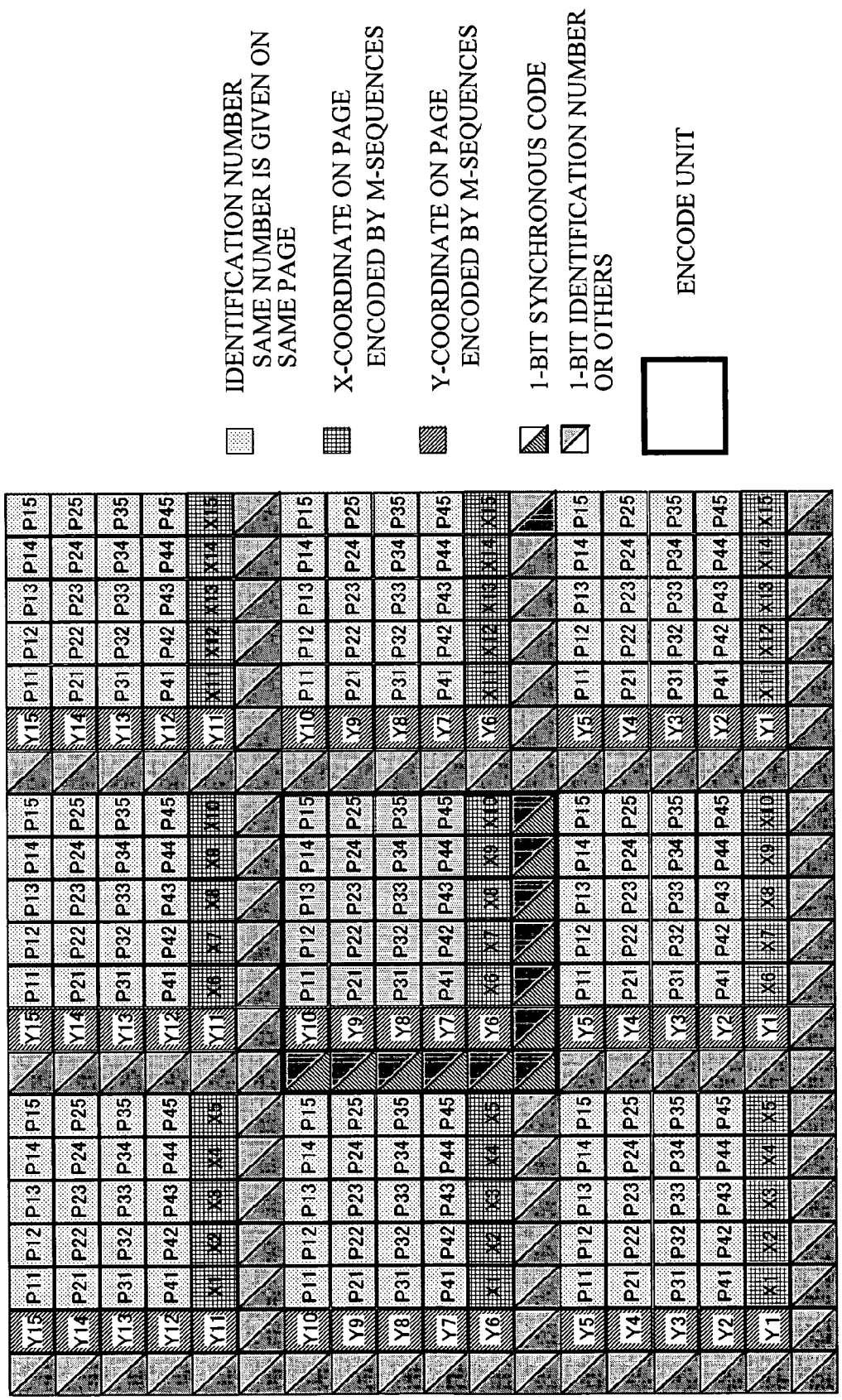
FIG. 1 is a view illustrating an encoding method embodying the present invention.
Figure 2A:
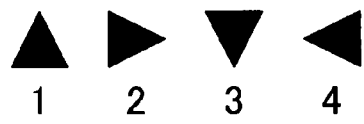
FIGS. 2A and 2B show examples of symbols.
Figure 2A:
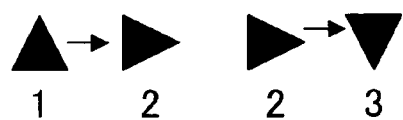
Figure 2A:
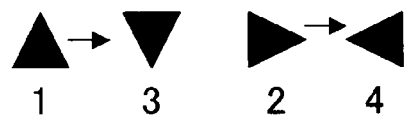
Figure 2A:
Figure 2B:
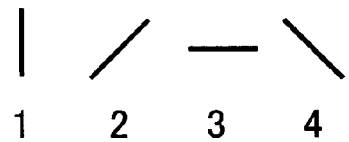
Figure 2B:
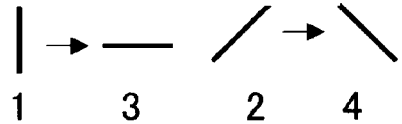
Figure 2B:
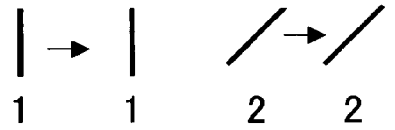
Figure 2B:
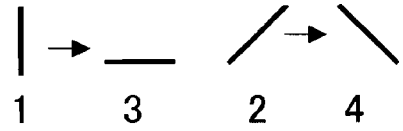

The whole area to be encoded is divided into planes of practically useful size such as A3 or A4, and each of the planes is the area to be encoded invisibly, in accordance with the present embodiment. Hereinafter, the area to be encoded is simply referred to as page. Each page includes an identification number and coordinates (X, Y). The identification number identifies the page, and the coordinates (X, Y) indicate the location on the page. The identification number and the coordinates (X, Y) are separately encoded. Referring to FIG. 1, each page is divided into multiple encode units, so that each of the encode units may store given information. Each encode unit is represented as a shape of rectangle having seven squares arranged horizontally and six squares arranged vertically. One symbol is formed in one square. The symbol is used for representing an encoded code on the page. For example, there are asymmetric symbols shown in FIG. 2A or symmetric symbols shown in FIG. 2B. Each of the symbols shown in FIGS. 2A and 2B is capable of representing four pieces of information, namely, 2 bits, by rotating given angles. If, 600 dpi is employed for displaying the symbols, for example, one symbol is formed with 2 dots, and there is a pitch of 0.3 mm between the symbols. Also, another shape or another size of the symbol may be used according to the plane and the usage. The encode unit may include a more or less number of the symbols depending on the page and the area to be used.

Each encode unit stores symbols for identifying the identification information as shown in FIG. 1, other symbols for indicating an X-coordinate and a Y-coordinate, and further other symbols for indicating boundaries with other encode units (hereinafter referred to as synchronous code). As an example of arrangement of the symbols, referring to FIG. 1 again, the synchronous codes are arranged on the left part and the bottom part of each encode unit. Five symbols denoting the Y-coordinates are arranged adjacently to the left part in the Y direction, and five symbols denoting the X-coordinates are arranged adjacently to the bottom in the X direction. 20 symbols identifying the identification number are arranged inside the symbols identifying the X-coordinates and Y-coordinates in each encode unit.

The identification numbers are represented by 20 symbols as shown in FIG. 1. 2-bit information can be represented by one symbol. With 20 symbols, $2^{40}=1.1\times10^{12}$, namely, a trillion sheets of paper can be encoded. The symbols having the same identification number are included in multiple areas to be encoded on the same sheet of paper. Here, the 20 symbols are described as an example, yet the number of the symbols may be varied depending on the number of pages to be encoded.

The X-coordinates and the Y-coordinates are represented by the M-sequences codes. Each encode unit is represented by 10 bits (five symbols) on the X-coordinates and 10 bits (five symbols) on the Y-coordinates, and the length of the M-sequences code is 1,023 bits ($2^{10}-1=1023$). Here, the description is given with five symbols, yet the number of symbols may be varied depending on the area to be encoded.

Figure 3:
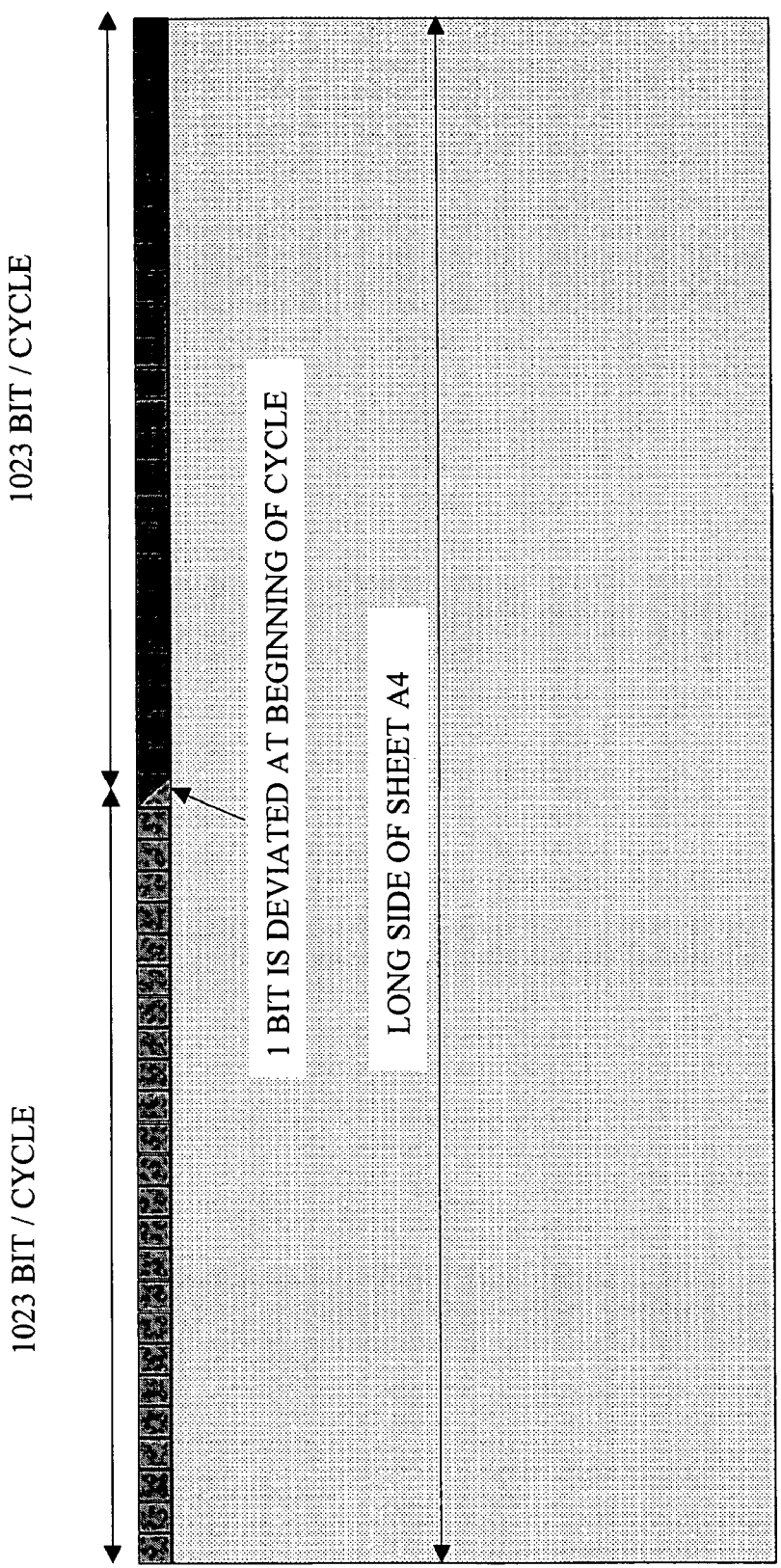
FIG. 3 shows an example of encoding a long side of a sheet size A4.

If one symbol is represented by 2 bits, the aforementioned 1,023 bits represents 511.5 symbols. This results in only a half of the long side of the size A4, as shown in FIG. 3. However, this cycle is an odd number of 1,023 bits, and 1 bit is shifted in the next cycle. It is therefore possible to encode the long side of the sheet size A4 with the use of two cycles.

The synchronous codes, which serve as a boundary or edge of the encode units, use 1 bit in the 2 bits included in one symbol. The multiple encode units shown in FIG. 1 are segmented by the synchronous codes. By providing the synchronous codes, it is readily possible to identify the location being read at the time of reading the information recorded on a printed material. All the synchronous codes are configured to be either "0" or "1". The detection of the continuing same values makes it possible to indicate the edge of the encode unit at the time of reading the information. The remaining bit included in one symbol may be used for the identification number or an error-detecting code.

If the synchronous code is predetermined, it is effective for determining the directions of the identification number or the symbols representing the X-coordinates or Y-coordinates. For example, assuming that "1" is set to the synchronous code and "2" is acquired when the page is scanned. This indicates that the page is rotated at 90 degrees as shown in FIGS. 2A and 2B. By rotating at 90 degrees in the reverse direction, the symbol representing the identification number, the X-coordinate, and the Y-coordinate can be read properly.

At least a predetermined size (the size of the encode unit) on a sheet of paper is to be read. If the size to be read is not equal to the predetermined size accurately and includes multiple encode units, the identification number and the values of the X-coordinates and Y-coordinates can be supplemented by the information obtained from other encode units.

First code information denotes the symbol or encoded information of the coordinate values identifying a location on the printed material and second code information denotes the symbol or encoded information of the identification number identifying the printed material.

(Configuration of an Image-Forming Apparatus)

Figure 5:
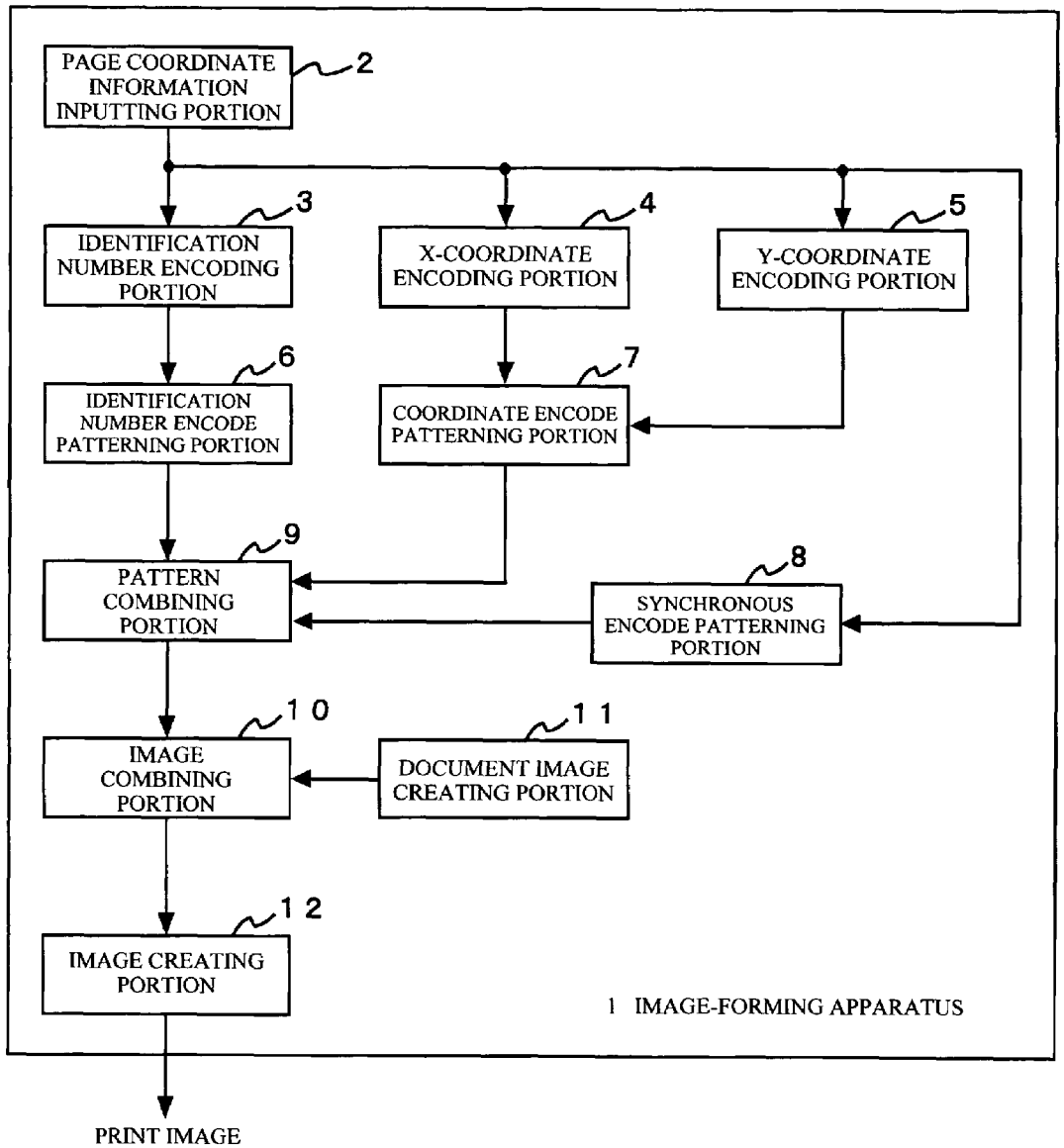
FIG. 5 shows a configuration of an image-forming apparatus.

FIG. 5 shows a configuration of an image-forming apparatus that prints the above-mentioned printed material. An image-forming apparatus 1 shown in FIG. 5 includes a page coordinate information inputting portion 2, an identification number encoding portion 3, an X-coordinate encoding portion 4, a Y-coordinate encoding portion 5, an identification number encode patterning portion 6, a coordinate encode patterning portion 7 (a symbol creating portion), a synchronous encode patterning portion 8 (the symbol creating portion), a pattern combining portion 9, an image combining portion 10, a document image creating portion 11, and an image creating portion 12.

The page coordinate information inputting portion 2 inputs a paper size, a print direction, and the identification number. The identification number encoding portion 3 encodes the identification number that has been input, and outputs location information to the identification number encode patterning portion 6. The location information includes an arrangement of the identification number that has been encoded. An encode method is not limited particularly, yet 40 bits can be used for indicating the identification number in accordance with the present embodiment.

The X-coordinate encoding portion 4 determines the location into which the X-coordinate data is written, according to the paper size and the print direction that have been input. Then, the X-coordinate data is encoded by the M-sequences code and the encoded data and the location information are output to the coordinate encode patterning portion 7. In the same manner, the Y-coordinate encoding portion 5 determines the location into which the Y-coordinate data is written, according to the paper size and the print direction that have been input. Then, the Y-coordinate data is encoded by the M-sequences code and the encoded data and the location information are output to the coordinate encode patterning portion 7.

The identification number encode patterning portion 6 converts the encoded identification number into a pattern of the encoded symbols, and arranges the symbols representing the identification number on the location for arranging the identification number according to the location information. The coordinate encode patterning portion 7 converts the X- and Y-coordinates data that have been encoded by the M-sequences code, into the pattern of the encoded symbols, and arranges the symbols representing the X- and Y-coordinates on the locations for arranging the X- and Y-coordinates according to the location information.

The synchronous encode patterning portion 8 determines the location on which the synchronous code is arranged, according to the paper size that has been input. Then, the synchronous code is converted into the pattern of the encoded symbol so that the symbol of the synchronous code may be arranged on the location for arranging the synchronous code according to the location information.

The pattern combining portion 9 combines the symbol of the identification number, the symbol of the coordinates, and the symbol of the synchronous code to form the encode unit.

The document image creating portion 11 creates a document or image to be printed on a sheet of paper. The document image creating portion 11 may be connected to a personal computer (hereinafter referred to as PC) so as to read the document or the image created on the PC. Moreover, the document or the image may be read by a scanner to take into the document image creating portion 11.

The image combining portion 10 overlaps an invisible or hidden pattern of symbols that have been combined in the pattern combining portion 9 and a visible document or image acquired from the document image creating portion 11, so that a print image is formed. The print image formed in the image combining portion 10 is printed out from the image creating portion 12.

Figure 6:
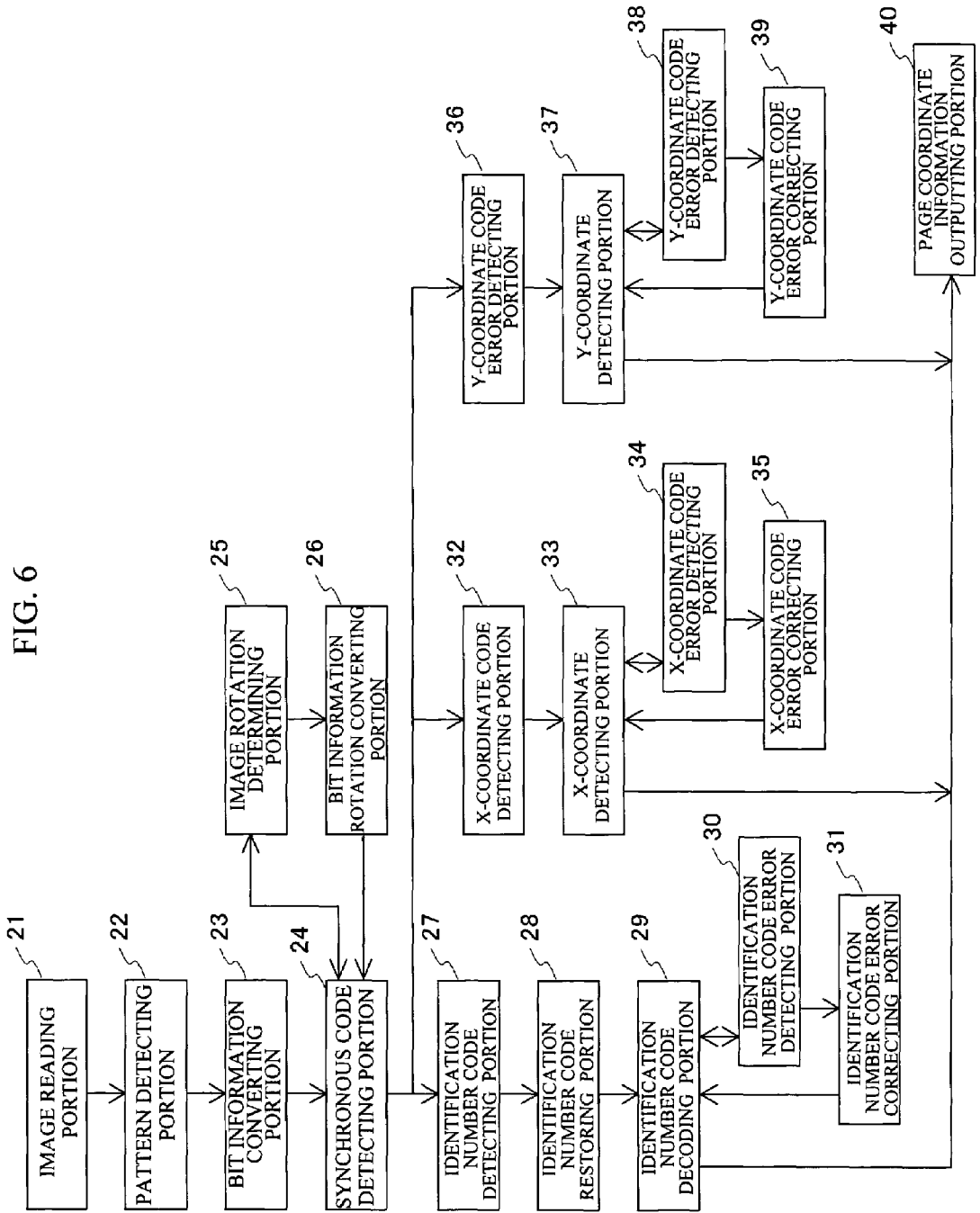
FIG. 6 shows a configuration of a two-dimensional coordinate identification apparatus.

Next, a description will be given of a two-dimensional coordinate identification apparatus 20, which reads the printed material having the location identification function shown in FIG. 1, and identifies the location on the printed material. The two-dimensional coordinate identification apparatus 20 shown in FIG. 6 includes an image reading portion 21, a pattern detecting portion 22, a bit information converting portion 23, a synchronous code detecting portion 24, an image rotation determining portion 25, a bit information rotation converting portion 26, an identification number code detecting portion 27, an identification number code restoring portion 28, an identification number code decoding portion 29, an identification number code error detecting portion 30, an identification number code error correcting portion 31, an X-coordinate code detecting portion 32, an X-coordinate decoding portion 33, an X-coordinate code error detecting portion 34, an X-coordinate code error correcting portion 35, a Y-coordinate code detecting portion 36, a Y-coordinate decoding portion 37, a Y-coordinate code error detecting portion 38, a Y-coordinate code error correcting portion 39, and a page coordinate information outputting portion 40.

The image reading portion 21 reads the image in the area that identifies the page and the coordinates. The pattern detecting portion 22 detects the symbol from the image that has been read. The bit information converting portion 23 converts the symbol that has been detected by the pattern detecting portion 22 into a bit matrix. The synchronous code detecting portion 24 scans the bit matrix to detect a bit string of the synchronous codes. The image rotation determining portion 25 determines a rotation angle of the image with the bit string of the synchronous codes. The bit information rotation converting portion 26 rotates the image in the reverse direction at the rotation angle that has been determined by the image rotation determining portion 25 to change the direction of the image into a correct one.

Figure 4:
FIG. 4 shows an example of an area to be read.
Figure 4:
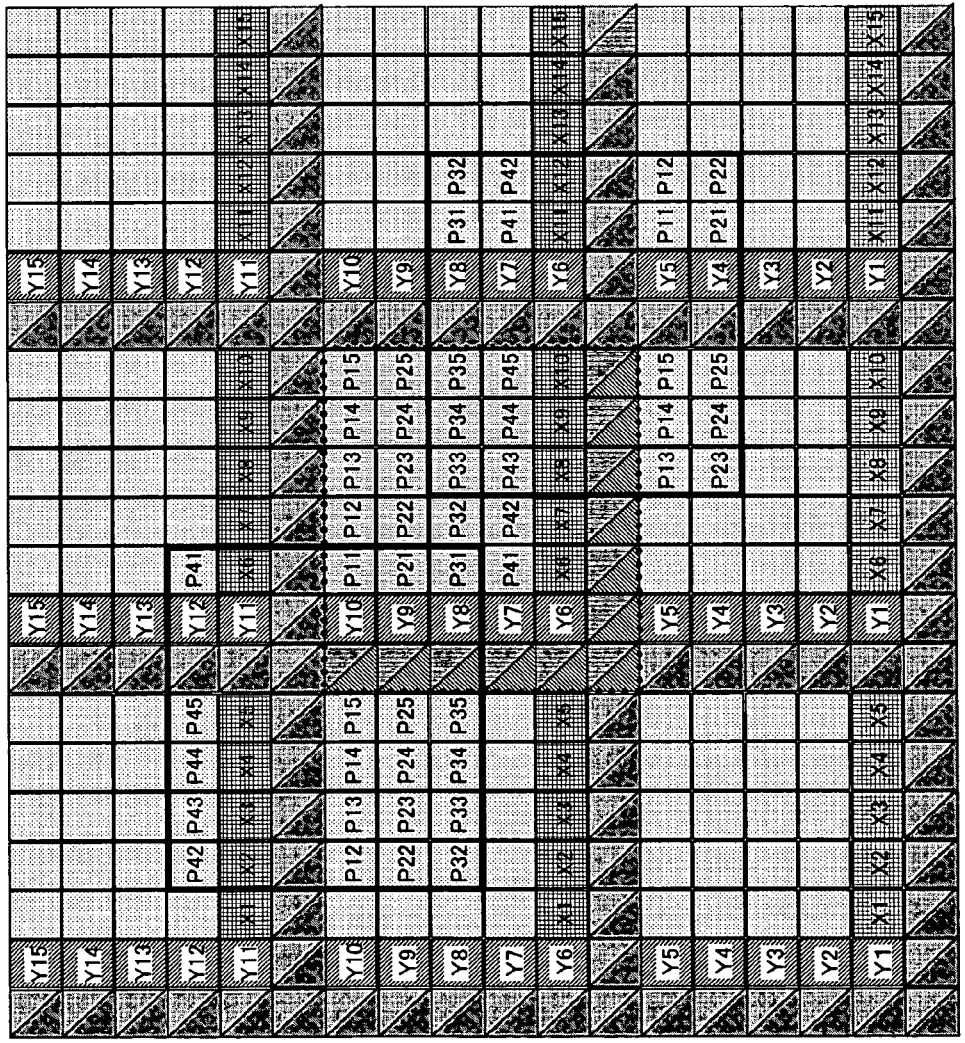

The identification number code detecting portion 27 detects the symbol of the identification number from an area that has been read, which includes four areas segmented by the synchronous codes as shown in FIG. 4. If the area that has been read does not correspond to the encode unit, the symbols of the identification number are extracted from the four areas segmented by the synchronous codes of the bit string.

The identification number code restoring portion 28 sorts the symbols extracted from the four encode units at most or deletes the identical symbol, in order to convert into the symbols of the identification number included in one encode unit as shown in FIG. 1. The symbols of the identification number include P11 through P15, P21 through P25, P31 through P35, and P41 through P45 (hereinafter, referred to as bit matrix). The identification number code restoring portion 28 also scans the bit matrix and converts into a bit string identifying the identification number.

The identification number code decoding portion 29 decodes the identification number that has been encoded. The identification number code error detecting portion 30 checks whether there is an error in the bit string identifying the identification number caused resulting from a noise or the like. The identification number code error correcting portion 31 corrects the error detected by the identification number code error detecting portion 30.

Figure 7A:
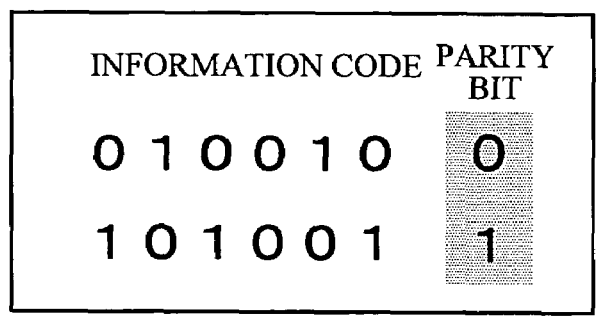
FIGS. 7A and 7B show parity bits for checking an error.
Figure 7B:
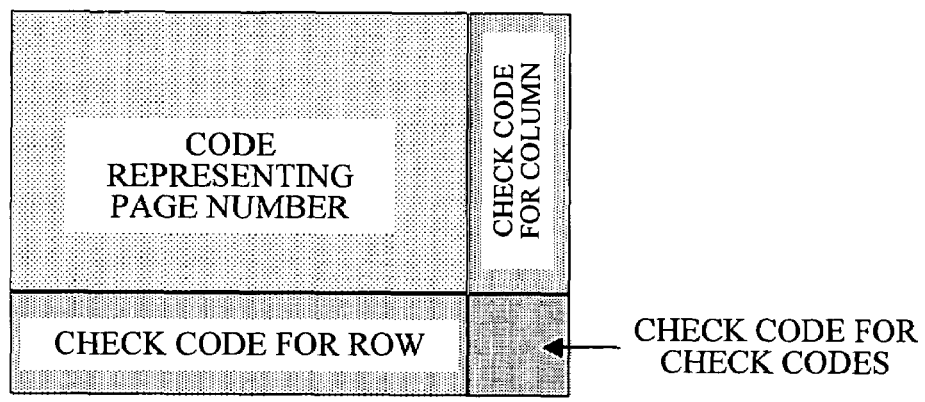

The error in the bit string identifying the identification number is detected with the use of a parity check code. Referring to FIG. 7A, the parity check code of "0" is added for checking an even number of the sum of the codes. The parity check code of "1" is added for checking an odd number of the sum of the codes. Referring to FIG. 7B, the parity check codes are provided for rows and columns. The parity check code may be included in the remaining 1 bit in the synchronous code, as described above. The RS (Reed-Solomon) code may be used for the error detection. The RS code has the smallest number of the check codes in the linear codes having an identical and smallest hamming distance. For example, if 40 bits of the RS code (10, 6) are encoded with a block length of four bits, the number of the blocks is set to 10, and the number of the information blocks is set to six, the encode efficiency results in approximately 0.6, enabling encoding approximately 6,000 sheets of paper. With the aforementioned encoding, two blocks at most can be corrected. Moreover, another error-correcting method may be employed.

The X-coordinate code detecting portion 32 detects the symbol representing the X-coordinate value and converts the symbol into a bit string representing the encoded X-coordinate. The X-coordinate decoding portion 33 decodes the bit string of the encoded X-coordinate to obtain the X-coordinate value. The operation the X-coordinate decoding portion 33 will be described later.

The X-coordinate code error detecting portion 34 checks whether there is an error in the bit string indicating the encoded X-coordinate. The X-coordinate code error correcting portion 35 detects the error, and corrects the error if the error can be corrected. The operation of the X-coordinate code error detecting portion 34 and the X-coordinate code error correcting portion 35 will be described later.

The Y-coordinate code detecting portion 36 detects the symbol representing the Y-coordinate value and converts the symbol into a bit string of the encoded Y-coordinate. The Y-coordinate decoding portion 37 decodes the bit string of the encoded Y-coordinate to obtain the Y-coordinate value. The operation the Y-coordinate decoding portion 37 will be described later.

The Y-coordinate code error detecting portion 38 checks whether there is an error in the bit string indicating the encoded Y-coordinate. The Y-coordinate code error correcting portion 39 detects the error, and corrects the error if the error can be corrected. The operation of the Y-coordinate code error detecting portion 38 and the Y-coordinate code error correcting portion 39 will be described later.

The page coordinate information outputting portion 40 outputs the decoded identification number, the X-coordinate value, and the Y-coordinate value.

A description will now be given of the method of detecting an error in the encoded coordinate values. Conventionally, referring to FIGS. 8A and 8B, bits for the parity check are added to detect the error in the encoded bit string. There are two methods of adding the parity bits. As shown in FIG. 8A, the parity bit is added to every partial sequences. On the other hand, as shown in FIG. 8B, the parity bit is added to every given number (degree) of bits. The parity bit provided in every partial sequences, as shown in FIG. 8A, enables a 1-bit accuracy, yet there arises a problem of excessive redundancy, because the bits for parity check are necessary as many as the number of data. In addition, the parity bit provided in every given (degree) number, as shown in FIG. 8B, is not redundant excessively, yet two times the length of the data has to be read for checking.

Figure 9:
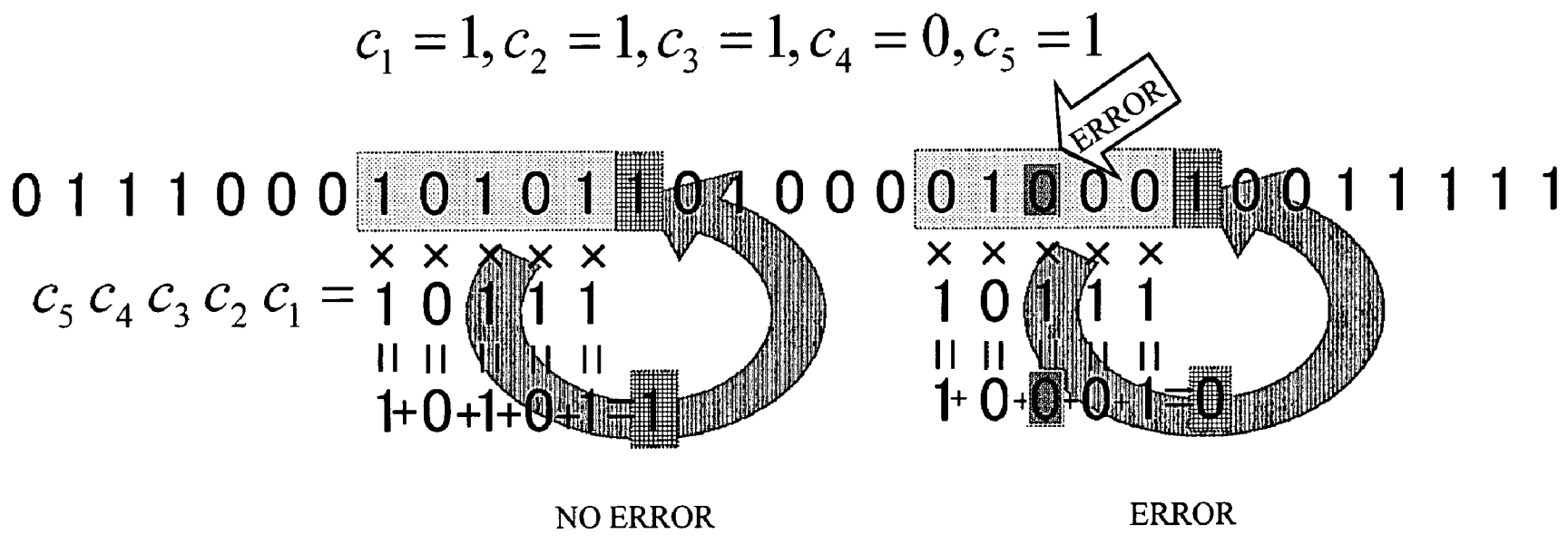

The error detection of the present embodiment utilizes the characteristics of the M-sequences code. As described, the X- and Y-coordinate values identifying the location on the page are encoded with the M-sequences code. The M-sequences code is calculated with the recurrence equation shown in Expression 1. It is therefore possible to check whether the partial sequences of (p+1) has a discrepancy with the recurrence equation that has generated the M-sequences code. Referring to FIG. 9, for example, the error code can be detected by checking whether the bit following randomly chosen five bits corresponds to the code generated by multiplying the randomly chosen five bits by coefficients C1 through C5. FIG. 9 shows the code that does not include an error on the left thereof, and shows the code that includes an error on the right thereof.

Figure 10A:
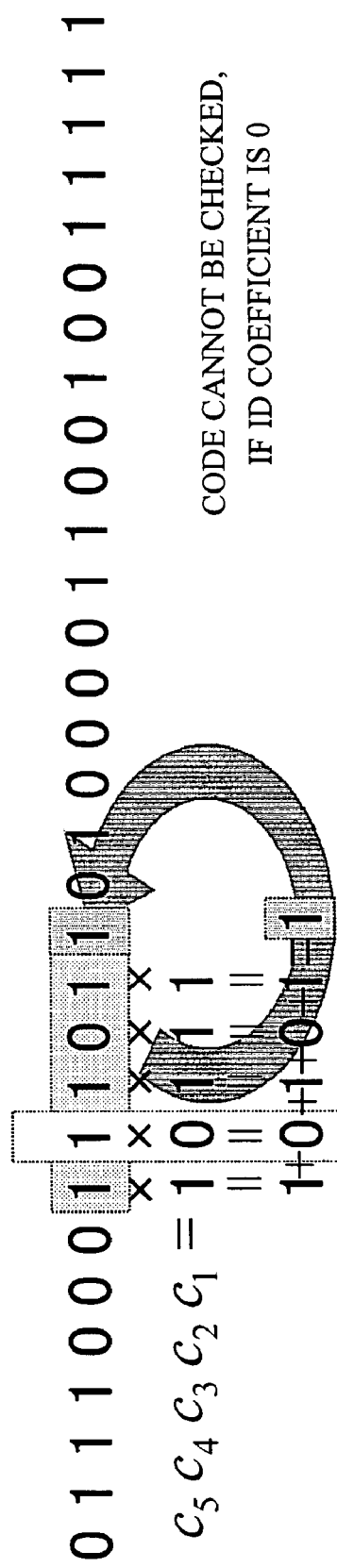
FIGS. 10A and 10B show another error-detecting method of the present invention.

Now, referring to FIG. 10A, however, with the coefficients C1 through C5 including "0", it is impossible to check the code corresponding to the position of "0". That is, if the number of "0" included in the coefficients C1 through C5 equals that of "0" included in the randomly chosen partial sequences, an error cannot be detected.

Figure 10B:
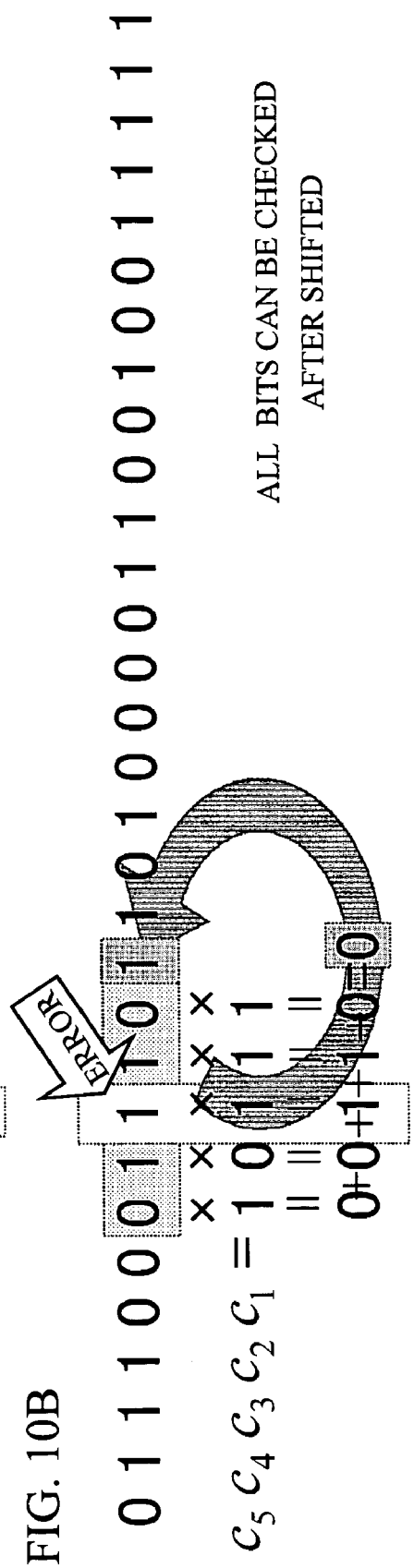
Figure 14:
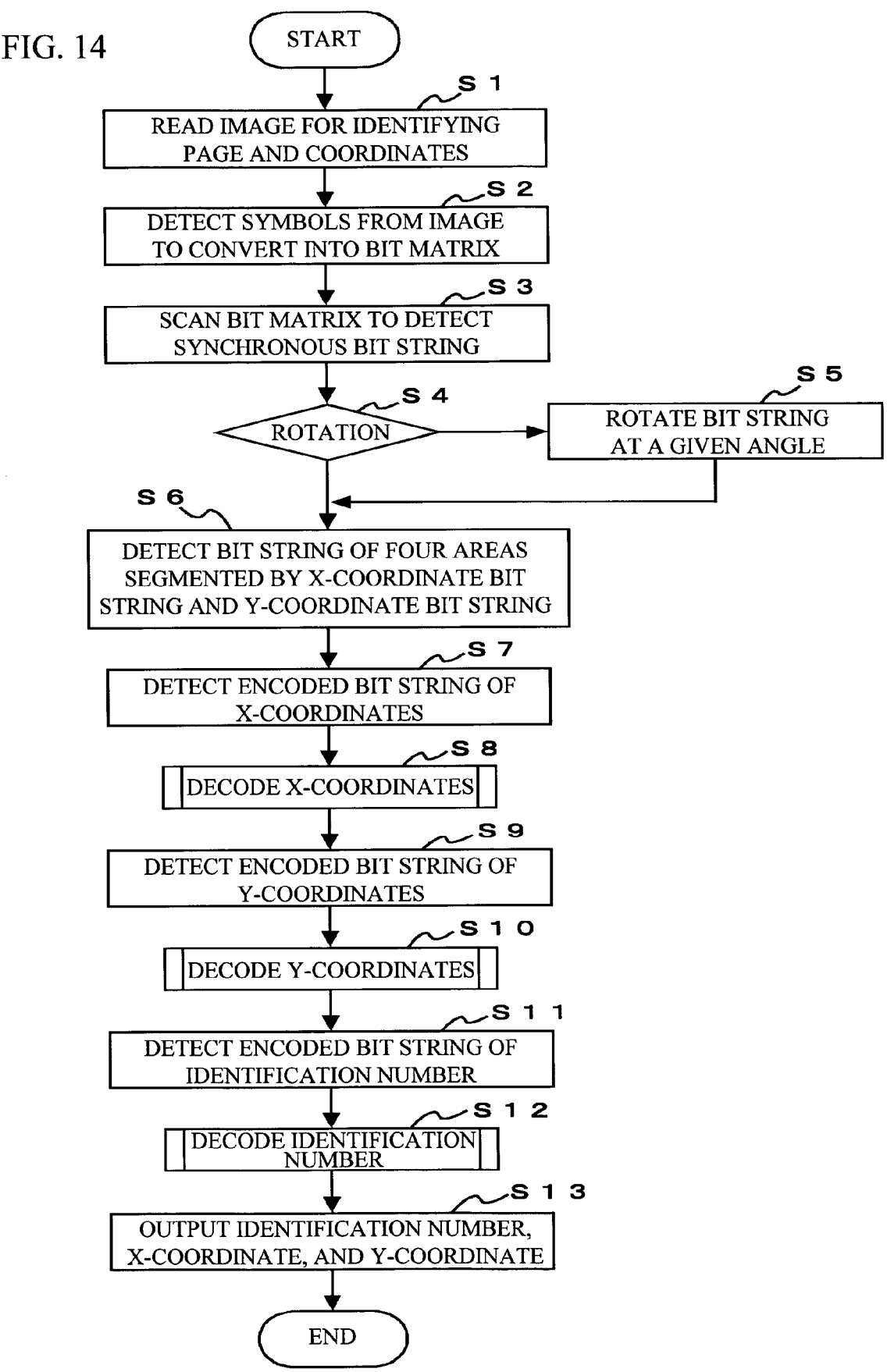
FIG. 14 is a flowchart showing an operation procedure of the two-dimensional coordinate identification apparatus.

Referring to FIG. 10B, the bit string is shifted forward or backward by 1 bit for the bit error detection, in accordance with the present embodiment. For example, the bit string to be checked is shifted forward by 1 bit as shown in FIG. 10B. This makes it possible to detect the bit error in the bit that corresponds to the coefficient of "0" shown in FIG. 10A.

In addition to the method for detecting the error in the encoded coordinate value as described above, another method may be employed. For example, the M-sequences code is employed in such a manner that at least 1 is a smallest hamming distance between continuous p-bit partial sequences, and another smallest hamming distance between (p+n)-bit partial sequences is at least 2 in which n more bit(s) is (are) added. Referring to FIGS. 11A and 11B, assuming that 1 bit has an error and p equals five. As shown in FIG. 11A, a partial sequences including the error may correspond to another partial sequences, resulting in a failure in the bit error detection. In contrast, as shown in FIG. 11B, 2 more bits are added to p, and seven bits are used. This enables the bit error detection, because the M-sequences code has no partial sequences that corresponds to the seven bits. The bit error can be detected in this manner.

Here, assuming that p=10 and n=4 in the M-sequences code, for example. The following Expression 2 shows the coefficients in the recurrence equation that generates the M-sequences code in which at least 2 is the smallest hamming distance between (p+n)-bit partial sequences.

$$\{c_1,c_2,c_3,c_4,c_5,c_6,c_7,c_8,c_9,c_{10}\}=\{1,1,0,1,0,1,1,0,0,1\} \quad \text{(Expression 2)}$$

3 is the hamming distance of the (10+4)-bit partial sequences in the M-sequences code. This makes it possible to detect at least 2 bits of error and correct 1 bit of error.

FIG. 12 shows the number of the error bits and detection probability. With this detection probability, if the bit error rate is 4 percent, the probability of detection error is 0.128 percent. If the bit error rate is 3 percent, the probability of detection error is 0.059 percent.

Next, assuming that p=11 and n=5 in the M-sequences code, for example. The following Expression 3 shows the coefficients in the recurrence equation that generates the M-sequences code in which the smallest hamming distance between (p+n)-bit partial sequences is at least 3.

$$\{c_1,c_2,c_3,c_4,c_5,c_6,c_7,c_8,c_9,c_{10},c_{11}\}=\{1,1,0,1,1,1,1,1,0,0,1\} \quad \text{(Expression 3)}$$

3 is the hamming distance of the (11+5)-bit partial sequences in the M-sequences code. This makes it possible to detect at least 2 bits of error and correct 1 bit of error.

FIG. 13 shows the number of the error bits and detection probability. With this detection probability, if the bit error rate is 4 percent, the probability of detection error is 0.078 percent. If the bit error rate is 3 percent, the probability of detection error is 0.037 percent.

Now, a description will be given of the operation procedure of the two-dimensional coordinate identification apparatus 20 with reference to flowcharts in FIGS. 14 through 17. First, referring to FIG. 14, the whole operation will be described. The two-dimensional coordinate identification apparatus 20 reads the image included in the area for identifying the page and the coordinates (step S1). Then, the symbol is detected from the image that has been read and converted into the bit matrix (step S2). The bit matrix is scanned to detect the bit string of the synchronous code (step S3). It is determined whether the image has to be rotated judging from the bit string of the synchronous codes that have been detected (step S4). If the image has to be rotated (YES/step S4), the image is rotated at a rotation angle in the reverse direction (step S5).

Next, the two-dimensional coordinate identification apparatus 20 detects the bit matrix included in the four areas segmented by the bit string of encoded synchronous codes in the X direction and in the Y direction, both of which intersect with each other (step S6). Then, the bit string of the X-coordinate is detected (step S7). After the detection of the aforementioned bit string, the X-coordinate is decoded with the bit string that has been detected (step S8).

The bit string of the encoded Y-coordinate is detected (step S9). The Y-coordinate is decoded with the bit string that has been detected (step S10).

The bit string of the encoded identification number is detected (step S11). The identification number is decoded with the bit string that has been detected (step S12).

The page coordinate information outputting portion 40 outputs the identification number, the X-coordinate value, and the Y-coordinate value that have been obtained with the above-mentioned procedure.

Figure 15:
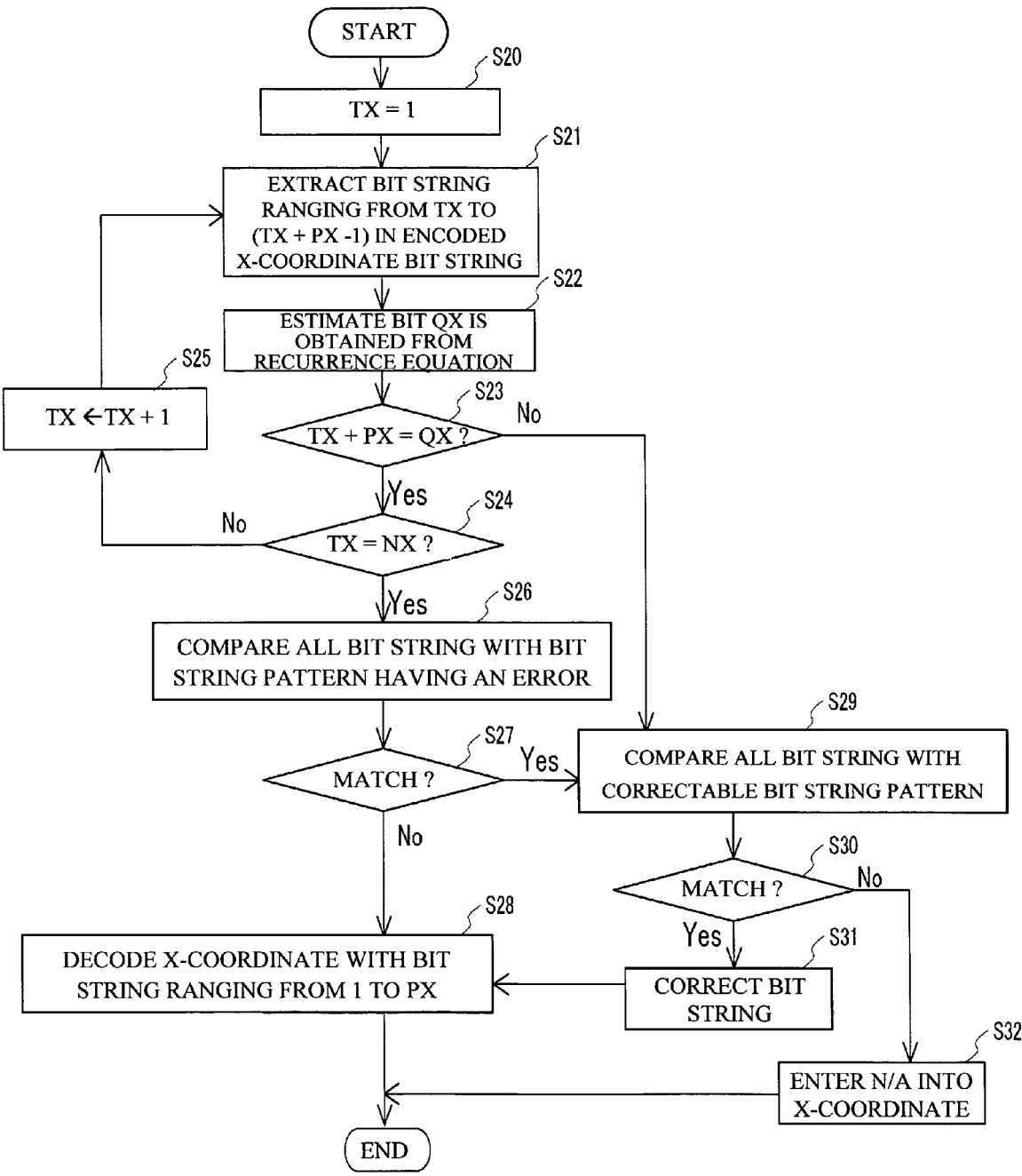
FIG. 15 is a flowchart showing a decode procedure of X-coordinate.

A description will now be given of the procedure in which the x-coordinate value is decoded with reference to the flowchart shown in FIG. 15. First, TX=1 is set at either a leftmost or rightmost bit in the bit string of the X-coordinate (step S20). Here, TX denotes a parameter indicating the bit to be decoded. The bit string ranging from the bit of TX to the bit of (TX+PX−1) is obtained (step S21). Here, PX denotes a degree of the M-sequences code used for encoding the X-coordinate. A predicted value QX (QX=TX+PX) is obtained with the use of the bit string from TX to (TX+PX−1) and the recurrence equation of the M-sequences code (step S22). Then, the predicted value QX is compared with (TX+PX) that has been obtained (step S23). If QX is not equal to (TX+PX) (NO/step S23), the whole bit string is checked with a correctable bit string pattern (step S29). The correctable bit string pattern is a pattern that can predict a correct bit pattern from an incorrect bit pattern. If the bit string that has been detected corresponds to the correctable bit string pattern (YES/step S30), the bit string is corrected with the correctable bit string pattern (step S31). If the bit string that has been detected does not correspond to the correctable bit string pattern (NO/step S30), N/A (not applicable) is entered (step S32).

If predicted value QX is equal to (TX+PX) that is obtained from the recurrence equation of the M-sequences code (YES/step S23), go to step S24 to determine whether TX corresponds to NX. Here, NX denotes the number of additional bits that indicates the range of TX used in the determinations in the steps S22 and S23. This NX corresponds to the range with which a bit error is to be found, after shifting the bit string forward or backward as shown in FIG. 10B. As shown in FIG. 10B, the bit string is shifted forward or backward by a given number of bits to check if there is a bit error that corresponds to the coefficient "0". If TX is not equal to NX (NO/step S24), the value of TX is incremented by one (step S25) and the procedure from the step S21 is repeated. If TX is equal to NX (YES/step S24), the whole bit string that has been detected is compared with an error bit string pattern (step S26). The error bit string pattern denotes another partial string in the M-sequences code used for encoding the X-coordinate. If the bit string that has been detected corresponds to the aforementioned another partial string in the M-sequences code (YES/step S27), the bit string that has been detected is determined to include an error.

If the bit string that has been detected corresponds to the error bit string pattern (YES/step S27), the whole bit string that has been detected is compared with the correctable bit string pattern (step S29). If the bit string that has been detected corresponds to the correctable bit string pattern (YES/step S30) as described above, the bit string is corrected with the correctable bit string pattern (step S31). If the bit string that has been detected does not correspond to the correctable bit string pattern (NO/step S30), N/A (not applicable) is entered. If the bit string that has been detected does not correspond to the error bit string pattern (NO/step S31), or if the bit string is corrected in the step S31, the X-coordinate is decoded with the bit string ranging from the first bit of TX to the bit of PX (step S28).

Figure 16:
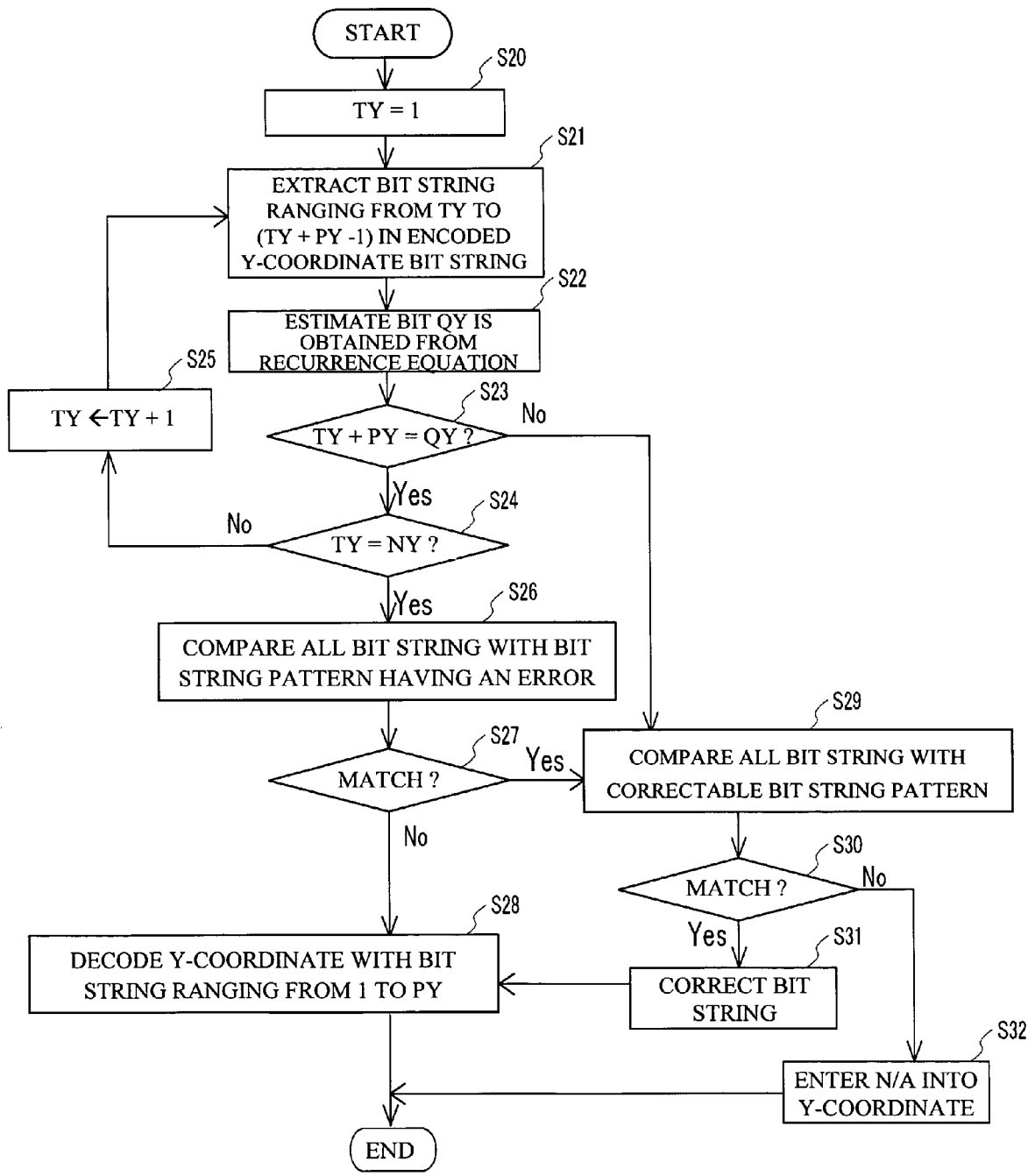
FIG. 16 is a flowchart showing a decode procedure of Y-coordinate.

FIG. 16 is the flowchart describing the decode procedure of the Y-coordinate. A description is omitted here, because the decode procedure of the Y-coordinate is same as that of the X-coordinate.

Figure 17:
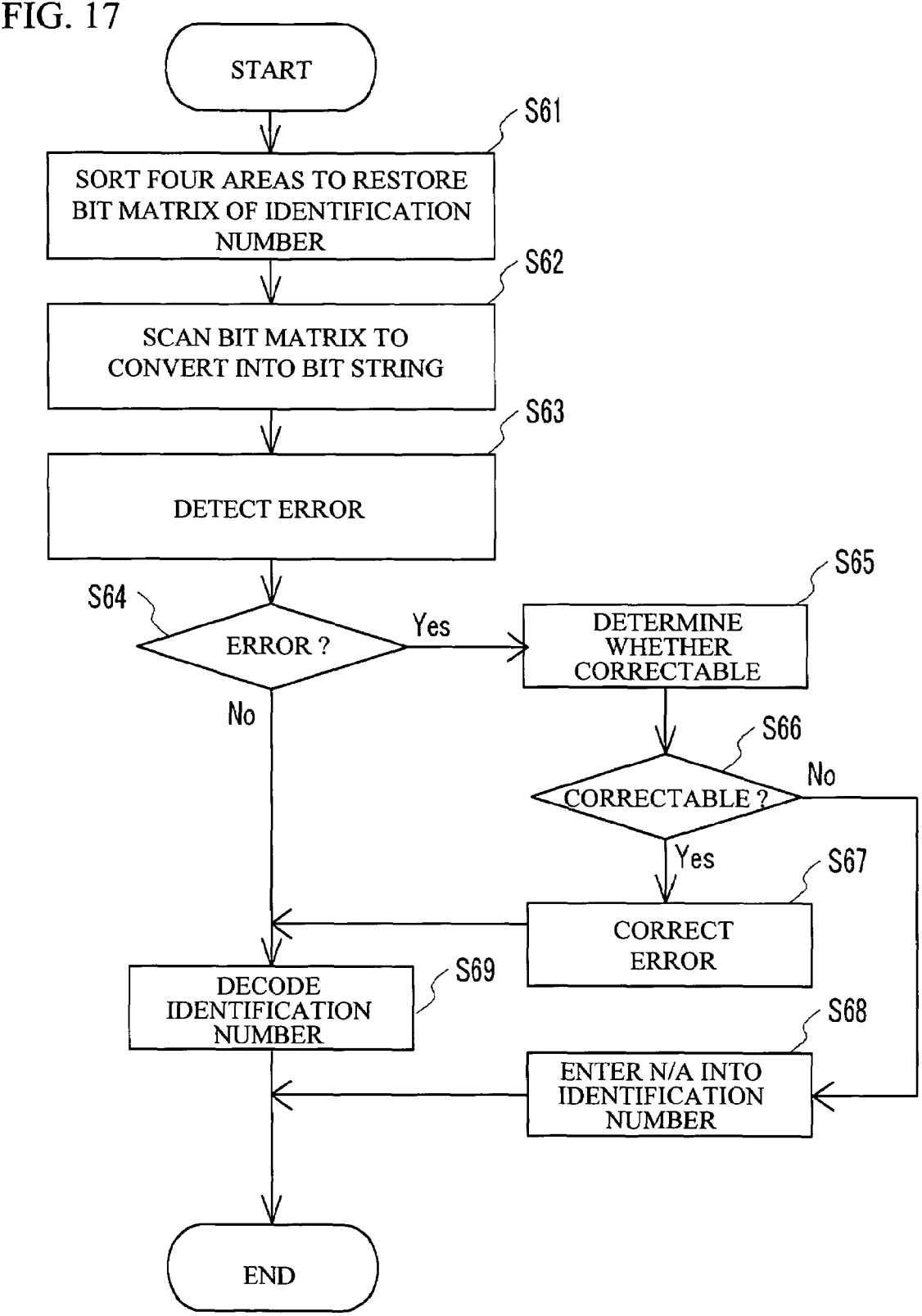
FIG. 17 is a flowchart showing a decode procedure of an identification number.
Figure 18:
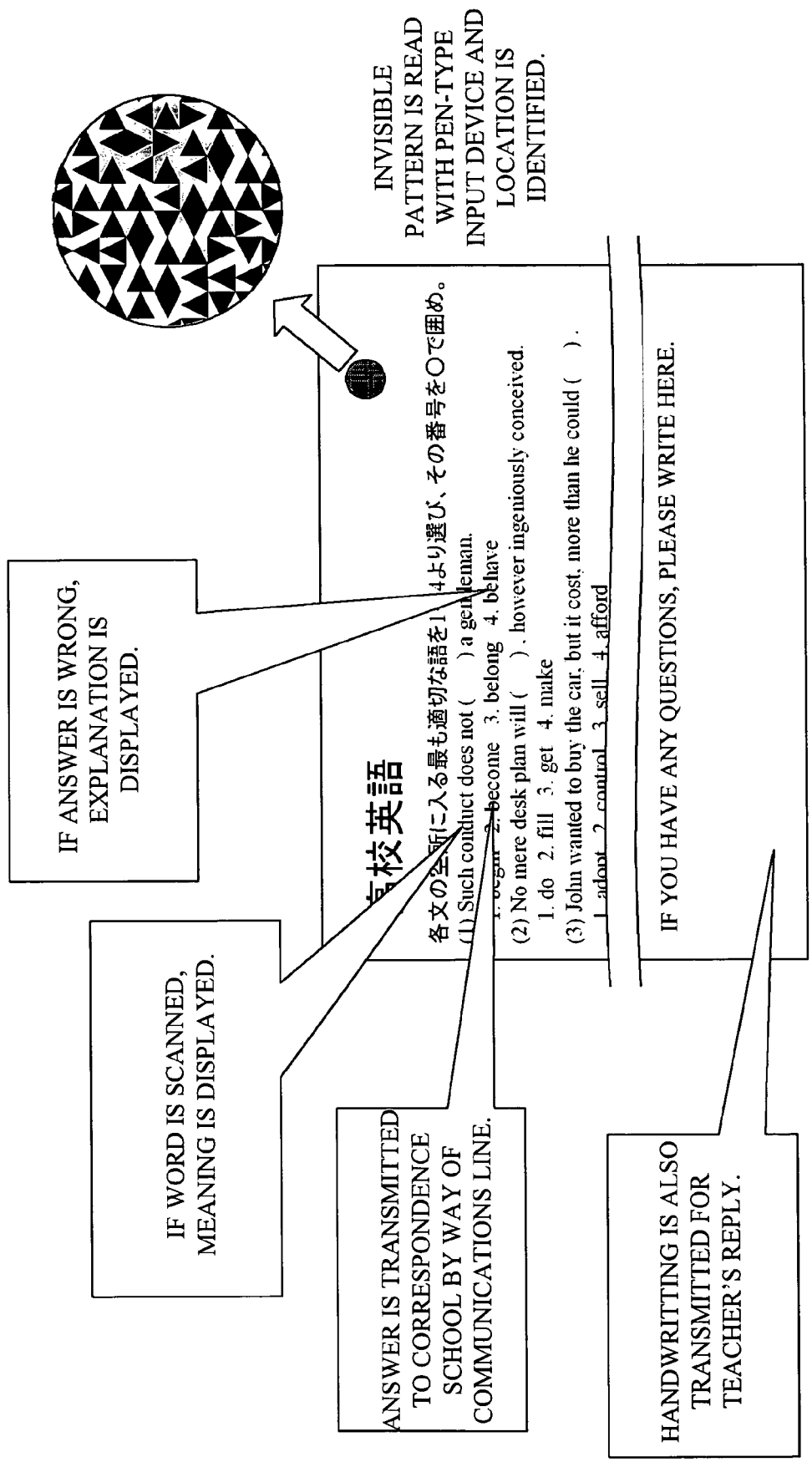
FIG. 18 is a view illustrating an example of the technique for identifying the location to be read on a two-dimensional plane.
Figures 19, 20:
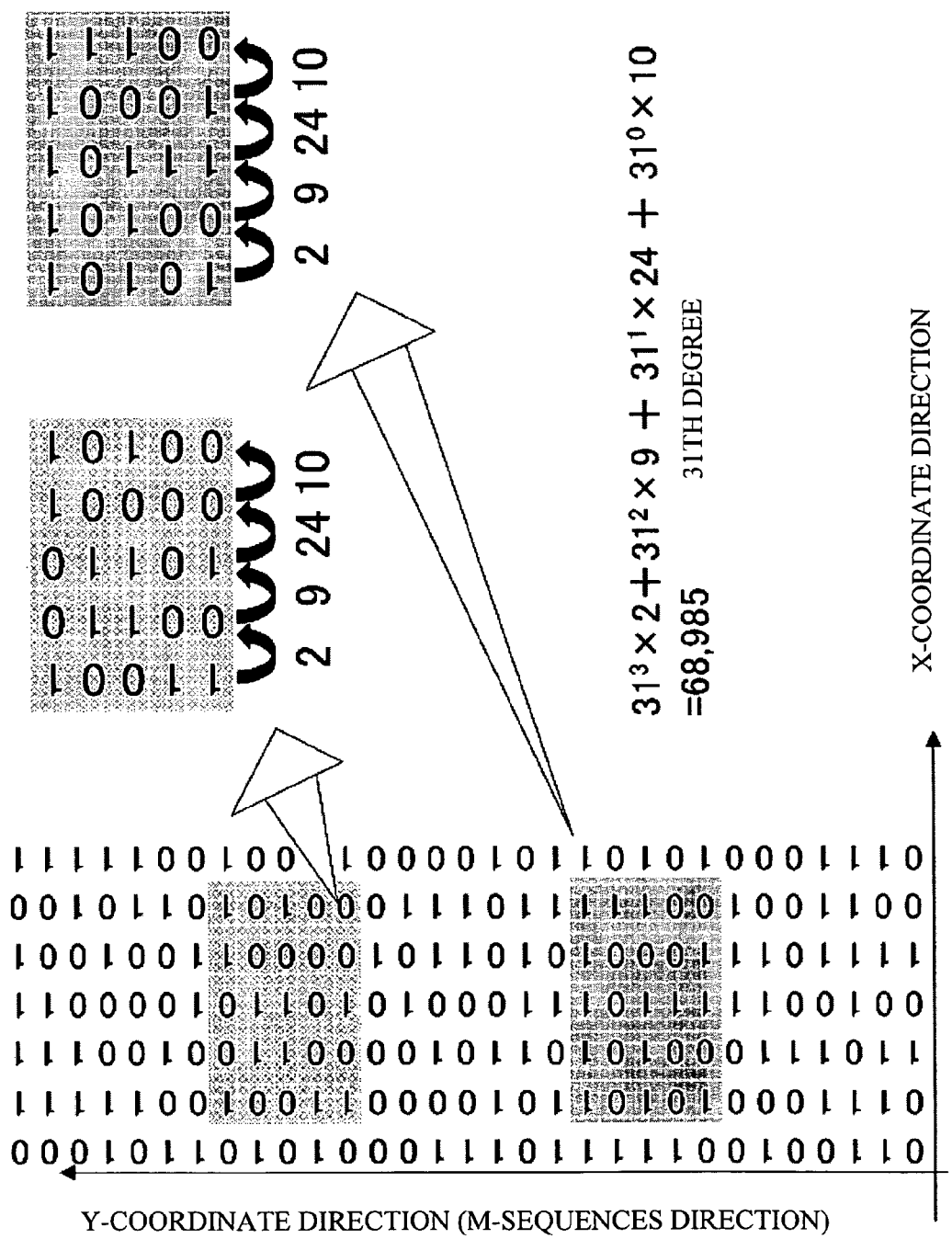
FIG. 19 is a view showing an M-sequences code.
FIG. 20 is a view showing a conventional encode method.

Next, a description will be given of the decode procedure of the identification number with reference to the flowchart shown in FIG. 17.

First, the bit matrix included in the four encode units, each of which is segmented by the encoded bit string of the X-coordinate and the encoded bit string of the Y-coordinate, is sorted to restore the bit matrix identifying the identification number (step S61). Then, the bit matrix that has been restored is scanned and converted into the bit string identifying the identification number (step S62). The bit string that has been converted is checked whether there is an error (step S63). If there is an error (YES/step S64), the error is determined whether the error is correctable (step S65). If the error is correctable (YES/step S66), the error is corrected (step S65) and the page is restored (step S69). If the error is not correctable (NO/step S66), N/A is entered into the identification number (step S68), and the procedure is completed. If there is no error in the bit string that has been restored (NO/step S64), the identification number is restored (step S69).

According to the present embodiment, an image in a given area is read from the printed material on which the code information of the coordinate values identifying the location on the page and the code information of the identification number on the page are invisibly recorded, so that the code information may be detected and decoded. This makes it possible to identify the identification number of the printed material and the coordinates thereon with high accuracy. In addition, the coordinate values and the identification number are invisibly recorded in each encode unit. Reading the encode unit enables to identify the location of the page and the identification number of the page.

Figure 21:
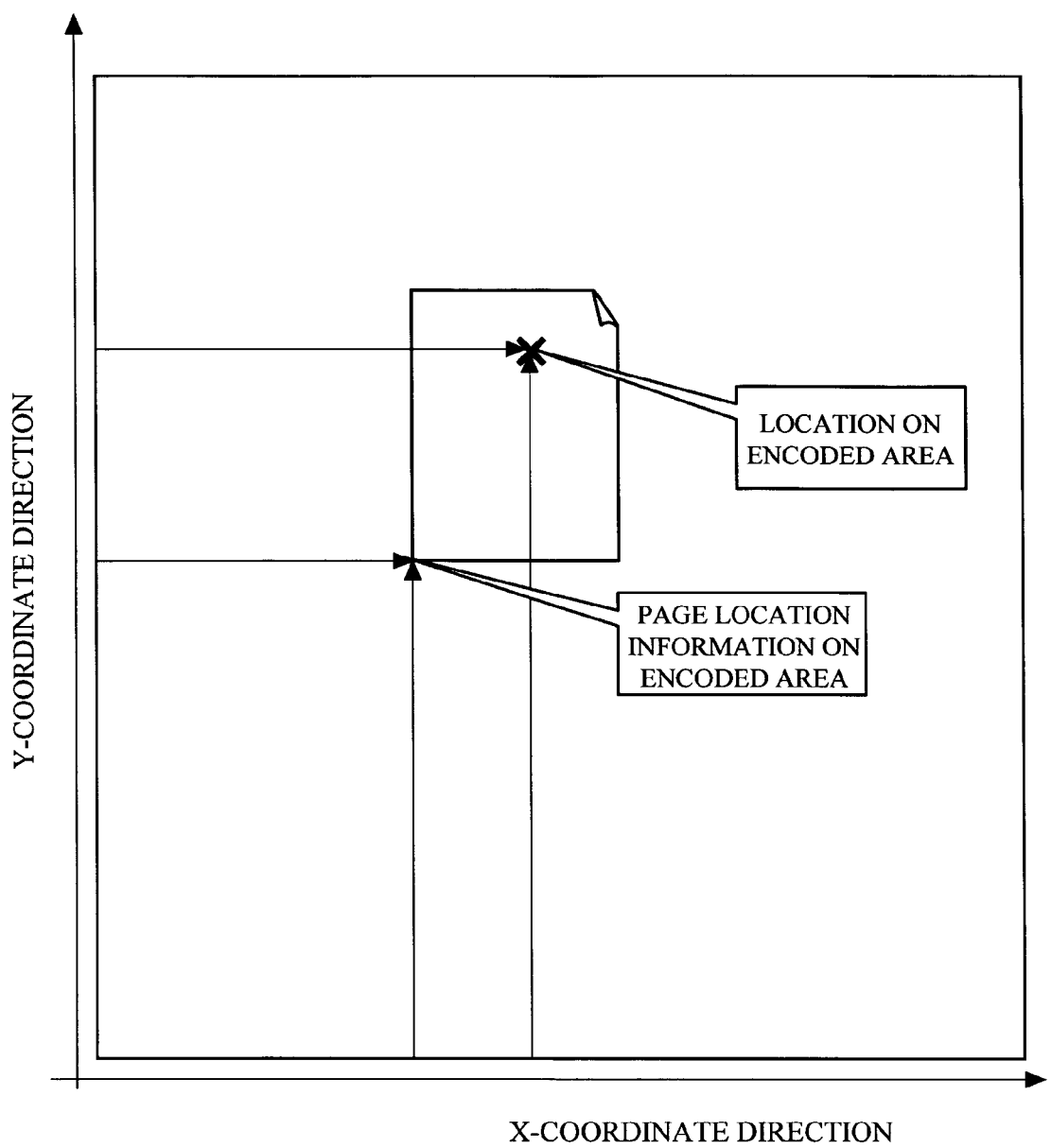
FIG. 21 is a view showing drawbacks in conventional techniques.

The printed material described above is applicable to calendar, keyboard printed on a sheet of paper, application form, application blank, and the like, in addition to a test paper shown in FIG. 21. With respect to the printed material on which the examination is printed, after an examinee selects the answers of the questions, the selected answers are transmitted to a center connected through a communications line, the score of the examination is counted, or advice is transmitted to an examinee's terminal device. With respect to the calendar, after a date is selected with an input pen, the code recorded in the area having the aforementioned date printed thereon is read by a two-dimensional coordinate identification encoding apparatus in order to display the schedule of the corresponding date on a display device.

On the printed material having the location identification function, the first code information is encoded by an M-sequences code. It is therefore possible to identify the coordinates even if any location on the printed material is read.

On the printed material having the location identification function, the multiple encode units are segmented by synchronous codes. It is easy to identify the location on the printed material at the time of reading.

On the printed material having the location identification function, each of the first and second code information is represented by symbols each capable of expressing multiple bits. Each of the first code information and the second code information is composed of a symbol, one bit of which can express multiple bits, resulting in a decrease in the number of the symbols invisibly recorded on the printed material.

On the printed material having the location identification function, the first and second code information and the synchronous codes are represented by symbols; and directions of the first and second code information can be indicated by the symbols representing the synchronous codes. The directions of the first code information and the second code information are identified so that the information can be extracted accurately.

On the printed material having the location identification function, the second code information is recorded repeatedly in each of the multiple encode units. The identification number is repeatedly recorded in every encode unit on the printed material, enabling decoding the identification number at what point or area is read on the printed material.

On the printed material having the location identification function, a size of the second code information is varied depending on a number of pages to be encoded. Even if the number of pages increase, it is possible to encode the pages.

On the printed material having the location identification function, a code length of the first code information is varied depending on a size of the area to be encoded. Even if the size of the printed material changes, it is possible to encode the pages.

On the two-dimensional coordinate identification apparatus, the detecting portion reads the first and second code information from the multiple encode units and detects the second code information. Even if the area to be read does not correspond to the encode unit, the first code information and the second code information can be detected with those in the multiple encode units. The location to be read does not have to be decided or worried about. The first and second code information provided at any point on the printed material is capable of identifying the identification number of the printed material and the location on the printed material.

On the two-dimensional coordinate identification apparatus, the first code information and the second code information are represented by symbols; symbols capable of identifying directions of the first and second code information are arranged among the multiple encode units; and the detecting portion identifies the directions of the symbols and the first and second code information. It is therefore possible to identify the directions of the symbols and extract the information accurately.

On the two-dimensional coordinate identification apparatus, further including an error detecting portion that detects an error in the first code information by adding a given number of bits to the first code information or by shifting the given number of bits forward or backward by 1 bit. It is possible to determine whether there is an error in the coordinate values that have been detected.

On the two-dimensional coordinate identification apparatus, the first code information of the coordinate values is composed of an M-sequences code; and the two-dimensional coordinate identification apparatus further comprises an error-detecting portion that determines whether a partial sequences of the M-sequences code corresponds to another partial sequences and detects an error in the first code information. It is possible to detect the error in the coordinate values.

On the two-dimensional coordinate identification apparatus, further including an error correcting portion that corrects the error that has been detected when a correct bit string can be estimated with the error that has been detected. If the error is correctable, the error can be corrected into a correct one.

On the image-forming apparatus, the coordinate values are encoded by an M-sequences code. The code information of the coordinate values is encoded by the M-sequences code, enabling identifying the coordinate values even if any location on the printed material is read.

On the image-forming apparatus, the identification number encoding portion changes a size of the second code information according to a number of pages to be encoded. It is therefore possible to encode the first and second code information if the number of the pages of the printed material increases.

On the image-forming apparatus, the coordinate encoding portion changes a size of the first code information according to an area to be encoded. It is therefore possible to encode the first and second code information if the size of the printed material changes.

On the two-dimensional coordinate identification method, further including detecting an error in the first code information by adding a given number of bits to the first code information or by shifting the given number of bits forward or backward by 1 bit. It is possible to determine whether the detected coordinate values have an error.

On the two-dimensional coordinate identification method, the first code information is composed of an M-sequences code; and the two-dimensional coordinate identification method further comprises an error-detecting portion that determines whether a partial sequences of the M-sequences code corresponds to another partial sequences and detects an error in the first code information. It is possible to correct the error properly.

Although a few embodiments of the present invention have been shown and described, it would be appreciated by those skilled in the art that changes may be made in these embodiments without departing from the principles and spirit of the invention, the scope of which is defined in the claims and their equivalents.

The entire disclosure of Japanese Patent Application No. 2005-054713 filed on Feb. 28, 2005 including specification, claims, drawings, and abstract is incorporated herein by reference in its entirety.

What is claimed is:

1. A two-dimensional coordinate identification apparatus comprising:

an image reading portion that reads an image provided in a given area on a printed material on which first code information of coordinate values identifying a location on the printed material and second code information of an identification number identifying the printed material are recorded in each of multiple encode units provided on an area to be encoded;

a detecting portion that detects the first code information and the second code information, with the image provided in the given area that has been read; and a decoding portion that decodes the first and second code information and invisibly outputs the identification number and the coordinate values;

wherein:

the first code information of the coordinate values is composed of a pseudo random M-sequences code, having the characteristic of any two partial sequences are not identical when partial sequences having a length of m are extracted from the M-sequences code having a length of 2m−1, and wherein the M-sequences code denotes the code having a longest cycle (2p−1) from among the sequences created with the p-th degree recurrence equation $$a_t = c_1 a_{t-1} + c_2 a_{t-2} + \ldots + c_p a_{t-p} \pmod{2},$$

where a and t are variables and c and p are constants; and the two-dimensional coordinate identification apparatus further comprises an error-detecting portion that determines whether a partial sequences of the M-sequences code corresponds to another occurring partial sequences and detects an error in the first code information upon determining a correspondence.

2. The two-dimensional coordinate identification apparatus according to claim 1, wherein the detecting portion reads the first and second code information from the multiple encode units and detects the second code information.

3. The two-dimensional coordinate identification apparatus according to claim 1, wherein:

the first code information and the second code information are represented by symbols;

symbols capable of identifying directions of the first and second code information are arranged among the multiple encode units; and the detecting portion identifies the directions of the symbols and the first and second code information.

4. The two-dimensional coordinate identification apparatus according to claim 1, further comprising an error detecting portion that detects an error in the first code information by adding a given number of bits to the first code information or by shifting the given number of bits forward or backward by 1 bit.

5. The two-dimensional coordinate identification apparatus according to claim 4, further comprising an error correcting portion that corrects the error that has been detected when a correct bit string can be estimated with the error that has been detected.

6. A two-dimensional coordinate identification method comprising:

reading an image provided in a given area on a printed material on which first code information of coordinate values identifying a location on the printed material and second code information of an identification number identifying the printed material are recorded in each of multiple encode units provided on an area to be encoded;

detecting the first code information and the second code information with the image provided in the given area that has been read; and decoding the first and second code information and invisibly outputting the identification number and the coordinate values;

wherein:

the first code information is composed of a pseudo random M-sequences code, having the characteristic of any two partial sequences are not identical when partial sequences having a length of m are extracted from the M-sequences code having a length of 2m−1, and wherein the M-sequences code denotes the code having a longest cycle (2p−1) from among the sequences created with the p-th degree recurrence equation $$a_t = c_1 a_{t-1} + c_2 a_{t-2} + \ldots + c_p a_{t-p} \pmod{2},$$

where a and t are variables and c and p are constants; and the two-dimensional coordinate identification method further comprises an error-detecting portion that determines whether a partial sequences of the M-sequences code corresponds to another occurring partial sequences and detects an error in the first code information upon determining a correspondence, and the reading an image, detecting the first code information, or decoding the first and second code information is performed by a two-dimensional coordinate identification apparatus.

7. The two-dimensional coordinate identification method according to claim 6, further comprising detecting an error in the first code information by adding a given number of bits to the first code information or by shifting the given number of bits forward or backward by 1 bit.

* * * * *